Aug. 7, 1934.  H. S. FRASER  1,969,504
DESUPERHEATER CONTROL
Filed May 24, 1929  2 Sheets-Sheet 1
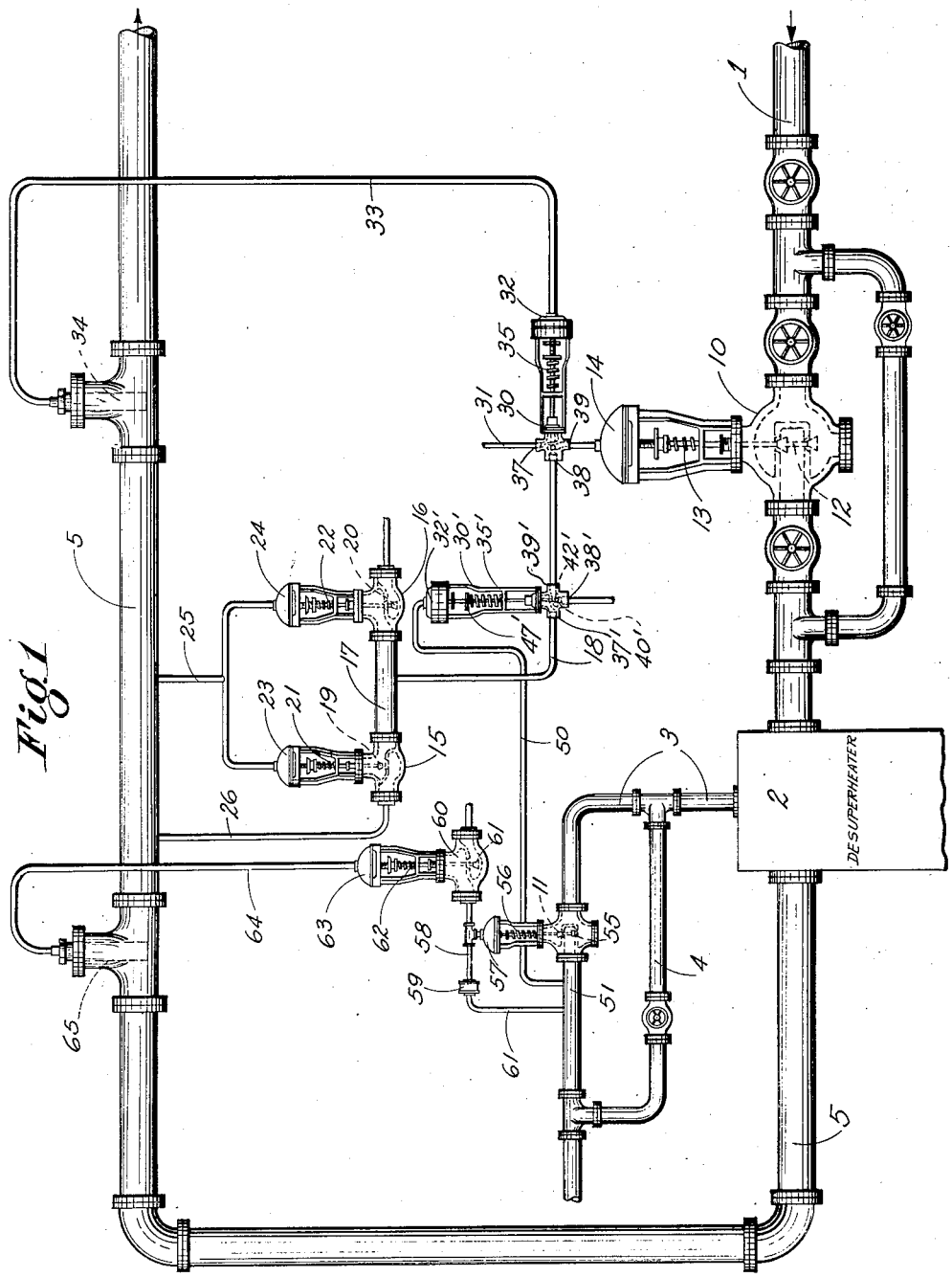
INVENTOR
HOWARD S. FRASER
BY
ATTORNEY

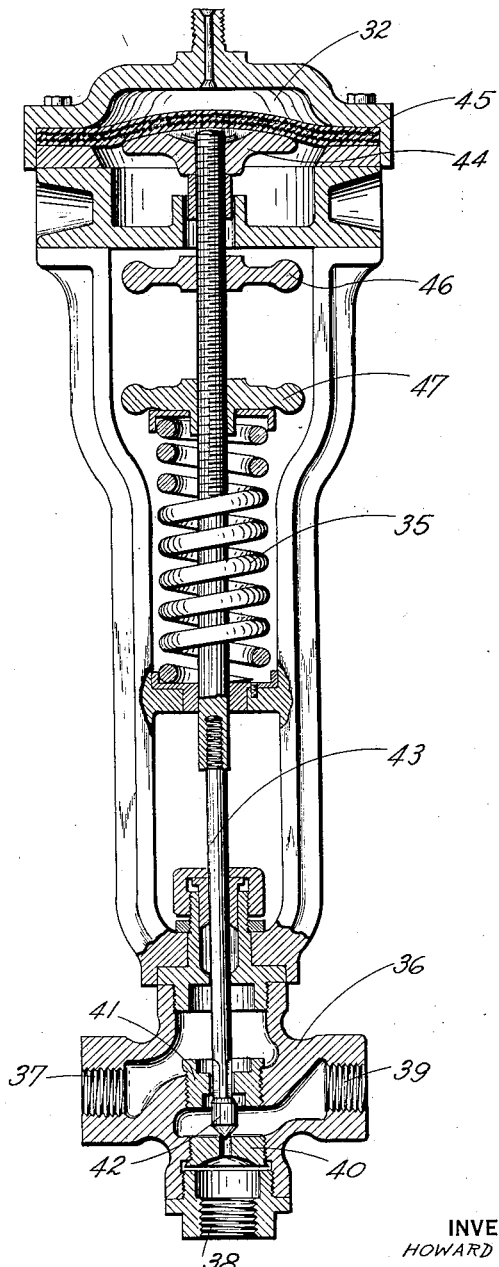

Patented Aug. 7, 1934

1,969,504

UNITED STATES PATENT OFFICE 1,969,504

DESUPERHEATER CONTROL

Howard S. Fraser, New York, N. Y., assignor to The Swartwout Company, Cleveland, Ohio, a corporation of Ohio Application May 24, 1929, Serial No. 365,709

33 Claims. (Cl. 122—479)

This invention relates to desuperheater controls and more particularly to the control of both steam and water and to the correlation or interconnection between such controls.

It is among the objects of my invention to provide means for reducing or controlling both temperature and pressure of superheated steam to the end that desuperheated steam may be obtained at a definite temperature, pressure and quality or degree of superheat. Another object is to provide a sensitive control for the addition of water to superheated steam to produce desuperheated steam of a desired quality or degree of superheat. A further object is to accurately control the pressure of the desuperheated steam while controlling the inflow of water in accordance with the temperature thereof. Thus by controlling both the temperature and pressure of the desuperheated steam, I am enabled to obtain desuperheated steam of the precise quality desired. A still further object is to control the addition of water to the desuperheater according to the temperature of the desuperheated steam while simultaneously controlling the inflow of superheated steam to the desuperheater. Another object is to incorporate in the control of the pressure reducing means a control which will restrict or cut-off the flow of superheated steam in the event the temperature of desuperheated steam goes beyond a predetermined limit. A further object is to throttle or cut-off the flow of superheated steam in the event the supply of water fails, or begins to fail. Another object is to incorporate the last mentioned controls with a master control for a reducing valve in the superheated steam line. One of the broader objects is to insure the safety of operation of the device and protect the apparatus using the desuperheated steam.

Other objects will appear from the following description of a preferred form of my invention, reference being had to the accompanying drawings. The essential characteristics are summarized in the claims.

In the drawings, Fig. 1 is a partly diagrammatic layout of the arrangement of parts constituting my invention; and Fig. 2 is a partially broken longitudinal section of the pilot valves illustrated in Fig. 1.

Referring particularly to Fig. 1, I illustrate a steam line 1, with a hand controlled by-pass, through which steam flows in the direction indicated to a desuperheater. Also leading to the desuperheater is a water pipe 3 having a hand controlled by-pass 4 through which water is fed to the desuperheater. The water and steam being mixed in the desuperheater flowing therefrom through the steam line 5 to various points of consumption and use. Positioned in the pipe 1 and arranged to throttle and control the flow of steam to the desuperheater is the valve 10. Positioned in the water line 3 and arranged to control the flow of water to the desuperheater is the valve 11. By controlling these valves and particularly by correlating the control of these valves, I am enabled to deliver steam from the desuperheater of any desired temperature, pressure, quality or degree of superheat.

The valve 10 has a balanced closure member 12 which is urged upwardly to closed position onto suitable seats by a spring 13 and may be forced downwardly from the seats in response to fluid pressure established in its diaphragm pressure chamber 14. By means of the valve 10 and the control of the pressure chamber 14, I am enabled to maintain within very accurate limits the pressure of the desuperheated steam flowing through the line 5. To control the pressure in the chamber 14, I provide a master control comprising essentially valves 15 and 16 which may be similar to that illustrated in my copending application, Serial No. 320,836, filed November 21st, 1928, which valves 15 and 16 have between them a conduit or compartment 17 in which pressures are established to be reflected through the conduit 18 into the chamber 14 of the valve 10.

The valve 15 has a closure member 19 which is urged away from its seat by a spring 21 and is forced toward its seat by fluid pressure established in its diaphragm chamber 23. The valve 16 is similar in all respects except that its closure member 20 is normally urged toward its seat by the spring 22 and forced away from its seat in response to pressure established in its diaphragm chamber 24. A conduit 25 leads from the steam line 5 to the chambers 23 and 24 so that like pressures are maintained therein. Increasing pressures in the steam line 5 tend to close the valve 15 while opening the valve 16 and decreasing pressures in the line 5 permitting the valve 15 to open while closing the valve 16.

Leading to the valve 15 is a conduit 26 shown to be connected to the steam line 5 which may as well be connected to any source of relatively constant fluid pressure. Since the operation of my control results in maintaining a very constant pressure in the line 5, I prefer to use it. It will thus appear that the actuating pressure established in the chamber 14 of the valve 10 depends upon the relative position of the valves 15 and 16. Thus a very small increase in opening of the valve 15 accompanied by a similar decrease in opening of the valve 16 greatly increases the pressure in the chamber 17, conduit 18, and chamber 14 thereby causing a relatively great movement of the valve 10.

The operation of the valve 10 is such as to reduce or hold the pressure in the line 5 from whatever it might have been in the line 1 to a constant amount which is held within very narrow limits by reason of the fact that the valves 15 and 16 can be made relatively small and highly sensitive with the result that very slight changes in pressure in the line 5 serve to create relatively large changes in pressure in the chamber 14 of the valve 10. The pressure in the line 5 may be established at any point by adjusting the tension on the springs 21 and 22 of the valves 15 and 16, or either of them.

From the foregoing description of the operation and control of the valve 10, it will be appreciated that steam is permitted to flow only when pressure is established in the chamber 14 sufficient to overcome the spring 13. If for any reason the pressure in the chamber 14 is caused to fail or be reduced, then to the extent of the failure or reduction the valve 10 moves to or toward closed position.

To insure the maintenance of the desuperheated steam below temperatures which might be harmful, I provide two agencies for cutting off the system, each of which contribute to the safety of the whole installation. Both these agencies operate to relieve the pressure in the chamber 14 wholly or partly, as the need may be. To start the operation of the apparatus when there is no steam flowing in the pipe 5, steam must be bypassed around the valve 10 so that an initial operating pressure will be established in the chamber 14. To this end, the bypass around the valve 10 is used.

The first of these agencies comprises a pilot valve 30 (see also Fig. 2) which is positioned in the conduit 18 and which normally permits free communication between the chambers 17 and 14. The valve 30 however, also controls communication to atmosphere, and in the event the temperature of the steam flowing through the pipe 5 exceeds a given amount, then the valve 30 acts to close communication between the chambers 17 and 14 while at the same time establishing communication between the chamber 14 and atmosphere. The valve 30 is preferably of the diaphragm actuated type having a pressure chamber 32 from which leads a conduit 33 to a thermo-responsive device 34, which is positioned in the steam main 5. The thermo-responsive device 34 may comprise a closed vessel or pressure generator containing an expansible fluid such as alcohol or water, which, when heated by steam flowing through the pipe 5, builds up a pressure tending to move the valve 30.

Referring particularly to Fig. 2, the valve 30 has a body part 36 provided with connections 37, 38 and 39. Adjacent the connection 38 is a seat 40, and adjacent the connection 37 is a seat 41, both seats being in adjustable screw-threaded relation to the body part 36. A closure member 42 is oscillatable between the seats 40 and 41 and engages the seat 40 to close communication with the connection 38 when it is moved to its lower limit of travel and engages the seat 41 to close communication through the connection 37 when it is moved to its upper limit of travel. There are of course, intermediate positions during which communication is afforded through both connections. The closure member is moved by a stem 43 passing through a suitable stuffing box and joined to a threaded extension, which extension engages at its extreme upper end a mushroom like member 44 contacting with a diaphragm 45. The diaphragm closes one side of the diaphragm chamber 32 mentioned above. A hand nut 46 limits the upward travel and may be turned, if desired, to hold the closure member 42 on the seat 40. A spring 35 surrounds the valve stem and is engaged between the frame of the valve and a hand nut 47, which nut may be turned on the extension of the stem to increase the tension of the spring to establish the pressure necessary to be created in the chamber 32 to move the closure member away from the seat 41.

Referring also to Fig. 1, it will be seen that the valve 30 is positioned in the conduit 18 through its connections 38 and 39 and that during the normal operation of the device, the spring 35 holds the closure member 42 in contact with the seat 41 and permits free communication through the connections 38 and 39. It will further be seen that as pressures are built up in the chamber 32, there will come a time, determined by the adjustment of the nut 47 and the spring 35, when the closure member will be moved away from the seat 41 thereby bleeding the conduit 18 and chamber 14 to atmosphere, and if the increase in pressure continues, the closure member 42 may be moved all the way to the seat 40 thereby cutting off the conduit 18 and leaving the chamber 14 of the valve 10 in free communication with atmosphere, completely closing the valve 10. The distance between the two seats 40 and 41 may be varied by screwing the same toward or away from each other, thereby adjusting the variation of the pressure in the chamber 14 which is effected by a given movement of the closure 42, as fully disclosed in the co-pending application of Henry J. Mastenbrook filed December 6, 1928, Serial No. 324,187.

The second agency is similar to the first in that it comprises a valve 30' which may be an exact replica of the valve 30, the parts whereof are given similar reference characters. This second agency however, acts to cut off or throttle the flow of steam through the desuperheater in the event of failure of the water supply. The valve 30' is placed in the conduit 18 and is connected therein with its connections 37' and 39' while its connection 38' leads to atmosphere. Thus to maintain communication through the conduit 18, the closure member 42' of the valve 30' must be held downwardly onto the lower seat 40' thereby closing communication with atmosphere and maintaining a free passageway through the valve between the connections 37 and 39. To hold the closure member down onto the lower seat, pressures must be maintained in the pressure chamber 32' sufficient to overcome the force of the spring 35', which force may be adjusted through the hand nut 47'.

Leading from the pressure chamber 32' is a conduit 50 which leads to the water supply pipe 3 at 51 ahead of the water valve 11. Thus the closure member 42' of the valve 30' is held onto the lower seat until such time as the water pressure falls below a value which may be set by the hand nut 47', and thereafter the closure member moves upwardly relieving the pressure in the conduit 18 and consequently the chamber 14 of the valve 10, thus closing or moving the valve 10 toward closed position.

As long as the water pressure is maintained above a predetermined value and as long as the temperature of desuperheated steam stays below a predetermined value, the function of the valve 10 is simply to control the pressure of desuperheated steam. However, if for any reason, the temperature of desuperheated steam goes beyond a predetermined point or if the water pressure falls below a predetermined point, then the operation of the valve 10 is interrupted or modified so that the input of superheated steam is reduced to the point where desuperheated steam may be safely consumed. Of course, if the temperature of desuperheated steam should continue to increase, or if the water pressure should continue to fall, the valve 10 would be moved to closed position and the system be entirely cut off until manually started by by-passing steam around the valve 10.

To control the input of water, I provide, as mentioned above, the valve 11 in the water line 3 having a closure member 55 urged away from its seat by a spring 56 and forced downwardly to closed position in response to pressures created in a diaphragm chamber 57. The diaphragm chamber 57 communicates with a length of pipe 58 at one end of which is a small orifice 59 and in the other end of which is a valve 60. Leading to the orifice is a conduit 61 from the water supply pipe or other suitable source of fluid pressure. The valve 60 is connected with the pipe 58 on one side and communicates with atmosphere on the other. The valve 60 has a closure member 61 urged toward its seat by an adjustable spring 62 and moved away from its seat in response to pressures created in its diaphragm chamber 63. The conduit 64 leads from the chamber 63 to a thermo-responsive device 65 positioned in the desuperheated steam line 5 and generally similar to the pressure generator 34, described above.

In operation of the water control, the valve 60 remains closed until the heat of the desuperheated steam tends to open it. As long as the valve 60 is closed, water pressure is maintained in the pipe 58 and the chamber 57 of the valve 11 thereby holding the valve 11 closed. As soon however, as the temperature of desuperheated steam comes to the predetermined point sufficient to generate pressures in the device 65 and the pressure chamber 63 of the valve 60 to overcome the force of the spring 62, then the valve 60 is cracked and pressure in the pipe 58 is relieved so that the closure member 55 of the valve 11 may move from its seat.

The pressure in the pipe 58 will depend upon the relation between the effective opening of the valve 60 and the size of the orifice 59. In practice I have found it effective, when using about a two inch water supply valve, to use a number 60 drill hole in the orifice 59. It will thus be appreciated that very slight changes in temperature of the desuperheated steam will have relatively very great effects in changing the pressure in the pipe 58 so that the movement of the water supply valve 11 is relatively great in response to very small variations in temperature of desuperheated steam.

From the foregoing it will appear that I have provided a complete desuperheater control and have incorporated in the control a high safety factor as well as a very sensitive regulation. It will also be appreciated that my control is susceptible to being adjusted within a broad range and capable of delivering desuperheated steam of any desired temperature, pressure, quality or degree of superheat. While the foregoing has described a preferred embodiment of my invention, I do not care to be limited to any specific embodiment or in any manner other than by the claims appended hereto.

I claim:—

1. In a desuperheater, the combination of means for controlling the flow of steam, means operatively connected with said first named means depending upon pressure of outflowing steam and means operatively connected with the said first named means depending upon the temperature of outflowing steam.

2. In a desuperheater, the combination of means for controlling the flow of steam, means for controlling the flow of water and means operatively connected with said first named means depending upon the pressure of the water supply.

3. In a desuperheater, the combination of means for controlling the inflow of steam, means for supplying water at a suitable pressure, means operatively associated with said first named means and controlling the flow of steam depending upon the water pressure, and means operatively associated with said first named means and controlling the flow of steam depending upon the temperature of outflowing steam.

4. In a desuperheater having inlet and outlet steam pipes and a water inlet pipe, the combination of means for controlling the flow through the steam inlet pipe, means operatively connected with said first named means depending upon the pressure of steam in the outlet pipe, means operatively connected with said first named means depending upon the temperature of steam in said outlet pipe, and means operatively connected with said first named means depending upon the pressure of water in said water inlet pipe.

5. In a desuperheater having inlet and outlet steam pipes and a water inlet pipe, the combination of a valve in the steam inlet pipe, means for controlling said valve depending upon the pressure in the outlet steam pipe and means for controlling the valve depending upon the pressure in the water inlet pipe.

6. In a desuperheater having inlet and outlet steam pipes and a water inlet pipe, the combination of a pressure actuable valve in the steam inlet pipe, fluid connections for conducting actuating fluid to said valve, means for controlling the flow of fluid in said connections and the resulting actuating pressure on said valve depending upon the pressure of steam in said outlet pipe, and means for controlling the flow of fluid in said connections depending upon the temperature of steam in said outlet pipe.

7. In a desuperheater having inlet and outlet steam pipes and a water supply pipe, the combination of a pressure actuable valve in one of said pipes, fluid conducting means for actuating fluid leading to said valve, means for controlling the flow of fluid in said conducting means in response to variations in pressure in said outlet steam pipe, and means for controlling the flow of fluid in said conducting means in response to variations in pressure in said water supply pipe.

8. In a desuperheater having inlet and outlet steam pipes and a water supply pipe, the combination of a pressure actuable valve in one of said pipes, fluid conducting means for actuating fluid leading to said valve, means for controlling the flow of fluid in said conducting means in reponse to variations in pressure in said water supply pipe, and means for controlling the flow of fluid in response to variations in temperature in said outlet steam pipe.

9. In a desuperheater having inlet and outlet steam pipes and a water supply pipe, the combination of a pressure actuable valve in one of said pipes, fluid conducting means for actuating fluid leading to said valve, means for controlling the flow of fluid in said conducting means in response to variations in pressure in said outlet steam pipe, means for controlling the flow of fluid in said conducting means in response to variations in pressure in said water supply pipe, and means for controlling the flow of fluid in response to variations in temperature in said outlet steam pipe.

10. In a desuperheater having inlet and outlet steam pipes and a water supply pipe, the combination of a pressure actuable valve for controlling the flow of steam through the desuperheater, a source of fluid pressure, a conduit leading from said source to said valve by which actuating pressures are established on said valve, said conduit having a plurality of branches to atmosphere, valve means associated with one of said branches actuable in response to changes in pressure of steam in said outlet pipe, valve means associated with another of said branches actuable in response to changes in temperature of steam in said outlet pipe, and valve means associated with another of said branches actuable in response to changes in water pressure in said water supply pipe.

11. The method of desuperheating steam which consists in varying the input of water according to the temperature of desuperheated steam and varying the input of steam according to the temperature of desuperheated steam.

12. The method of desuperheating steam which consists in adding water and varying the flow of steam according to changes in temperature of the steam to which the water is added.

13. The method of desuperheating steam which consists in adding water and varying the flow of steam according to the pressure of the supply of water intended to be added to the steam.

14. The method of desuperheating steam which consists in adding water and controlling the flow of steam according to changes in temperature and pressure of the steam to which the water is added.

15. The method of desuperheating steam which consists in adding water in amounts according to the condition of the steam and varying the flow of steam according to the temperature and pressure of the steam to which the water is added.

16. The method of desuperheating steam which consists in varying the input of water into the steam according to the temperature of desuperheated steam and varying the input of steam into the water according to the water pressure.

17. The method of desuperheating steam which consists in varying the input of water into the steam according to the condition of the steam and varying the input of steam into the water according to the water pressure.

18. The method of desuperheating steam which consists in adding water into the steam and varying the input of steam into the water according to the temperature of the desuperheated steam and the pressure of the input water.

19. In a desuperheater having a plurality of inlet pipes including a steam pipe, and at least one outlet pipe, the combination of a pressure actuated valve in said steam inlet pipe and means for establishing actuating pressures in said valve which vary in proportion to changes in pressure in another of said inlet pipes and the pressure in said outlet.

20. In a desuperheater having a steam inlet pipe and a water inlet pipe and one outlet pipe, the combination of a pressure actuated valve in said steam inlet pipe, means for establishing pressures on said valve which vary in proportion to changes in pressure in the other of said inlet pipes and the changes in temperature and pressure in said outlet pipe.

21. In a desuperheater having two inlet and one outlet pipes, one of said inlet pipes adapted to conduct superheated steam to said desuperheater, the other of said pipes conducting water to said desuperheater, said outlet pipe conducting desuperheated steam away from said desuperheater, a pressure actuated valve in said superheated steam pipe for governing the flow of superheated steam to said desuperheater, and means for establishing pressures in said valve which may vary in proportion to changes in pressure in said desuperheated steam pipe and the pressure in said water pipe.

22. In a desuperheater having two inlet and one outlet pipes, one of said inlet pipes adapted to conduct superheated steam to said desuperheater, the other of said pipes conducting water to said desuperheater, said outlet pipe conducting steam away from said desuperheater, a pressure actuated valve in said superheated steam pipe for governing the flow of superheated steam to said desuperheater and means for establishing pressures in said valve which may vary in proportion to changes in temperature in said desuperheated steam pipe and the pressure in said water pipe.

23. A method of desuperheating steam which consists in adding water to and controlling the flow of superheated steam according to changes in temperature and pressure of the desuperheated steam.

24. The method of desuperheating steam which consists in adding water to and controlling the flow of superheated steam according to changes in temperature and pressure of the desuperheated steam at a point beyond the zone of desuperheating.

25. In a desuperheater having inlet and outlet steam pipes and a water inlet pipe, the combination of a pressure actuated valve in the steam inlet pipe and means for establishing actuating pressures in said valve according to changes in pressure conditions in said steam outlet and according to pressure conditions in said water inlet pipe, and means for relieving the valve of pressure in response to changes in temperature conditions in said outlet steam pipe.

26. In a desuperheater having inlet and outlet steam pipes and a water inlet pipe, the combination of a pressure actuated valve in the inlet pipe and means for establishing actuating pressures in said valve according to changes in temperature and pressure conditions in said steam outlet, and means for relieving the valve of pressure in response to changes in pressure in the water inlet pipe.

27. The method of desuperheating steam which consists in adding water into the steam and varying the input of superheated steam into the water according to the temperature and pressure of the desuperheated steam and according to the pressure of the input water.

28. The method of desuperheating steam which consists in adding water to the steam and varying the input of steam into the water according to the temperature and pressure of the desuperheated steam and according to the pressure of the water added to the steam.

29. The method of desuperheating steam which consists in varying the input of water into the steam according to the temperature of the desuperheated steam and varying the input of the steam into the water according to the temperature of the desuperheated steam and according to the water pressure.

30. The method of desuperheating steam which consists in varying the input of water into the steam according to the temperature of desuperheated steam and varying the input of steam into the water according to the temperature and pressure of the desuperheated steam and according to the pressure of the input water.

31. The method of desuperheating steam which consists in adding water to the steam and varying the input of superheated steam into the water according to the pressure of desuperheated steam and according to the input water pressure.

32. The method of desuperheating steam which consists in varying the input of water into the steam according to the temperature of the desuperheated steam and in varying the input of steam into the water according to the pressure of the desuperheated steam and according to the pressure of the input water.

33. Apparatus for desuperheating steam which consists in a desuperheating chamber having an inlet for admitting superheated steam, an outlet for conveying desuperheated steam and a second inlet pipe for admitting water to said desuperheating chamber, a pressure actuated valve in said superheated steam inlet, a pressure actuated valve in said water inlet pipe, means for controlling the pressure actuated valve in the water inlet pipe in response to pressures developed on the water, and means for controlling the pressure actuated valve in said superheated steam line in response to pressures developed in the desuperheated steam.

HOWARD S. FRASER.